(12) United States Patent
Mitsuoka

(10) Patent No.: US 9,951,667 B2
(45) Date of Patent: Apr. 24, 2018

(54) RAPID ENGINE OIL DRAINING VALVE WITH PROTECTIVE COVERING

(71) Applicant: Norio Mitsuoka, Redmond, WA (US)

(72) Inventor: Norio Mitsuoka, Redmond, WA (US)

( * ) Notice: Subject to any disclaimer, the term of this patent is extended or adjusted under 35 U.S.C. 154(b) by 29 days.

(21) Appl. No.: 15/157,660

(22) Filed: May 18, 2016

(65) Prior Publication Data

US 2016/0356189 A1   Dec. 8, 2016

Related U.S. Application Data

(60) Provisional application No. 62/169,584, filed on Jun. 2, 2015.

(51) Int. Cl.
| | |
|---|---|
| *F01M 11/04* | (2006.01) |
| *F16K 35/02* | (2006.01) |
| *F16K 35/10* | (2006.01) |
| *F16K 27/06* | (2006.01) |

(52) U.S. Cl.
CPC ....... *F01M 11/0458* (2013.01); *F16K 27/067* (2013.01); *F16K 35/027* (2013.01); *F16K 35/10* (2013.01)

(58) Field of Classification Search
USPC .......... 137/377, 315, 392; 251/99, 148, 288, 251/286
See application file for complete search history.

(56) References Cited

U.S. PATENT DOCUMENTS

| | | | | |
|---|---|---|---|---|
| 1,056,344 | A * | 3/1913 | Lester | F16K 37/0016 137/556.6 |
| 1,131,224 | A * | 3/1915 | Ellwood | F16K 31/602 251/99 |
| 3,858,843 | A * | 1/1975 | Hartmann | F16K 35/00 251/99 |
| 4,078,763 | A * | 3/1978 | Yamamoto | F16K 5/0647 137/315.2 |
| 4,244,393 | A * | 1/1981 | Lehtinen | F16K 5/184 137/240 |
| 5,188,335 | A * | 2/1993 | Pettinaroli | F16K 35/06 137/315.18 |
| 5,647,389 | A * | 7/1997 | Holloway | F16K 31/602 137/15.18 |
| 6,540,206 | B2 * | 4/2003 | Guerra | F16K 5/0605 137/270 |
| 6,860,468 | B1 * | 3/2005 | Morin | F16K 35/027 137/614.06 |
| D701,946 | S * | 4/2014 | Mitsuoka | D23/245 |

* cited by examiner

*Primary Examiner* — Jessica Cahill
*Assistant Examiner* — Daphne M Barry

(57) ABSTRACT

A rapid engine oil draining valve is a device utilized to enable and disable the flow of engine oil from the drain port of a vehicle engine oil pan. A valve that is mechanically coupled to a lever is positioned within a valve housing and may be opened or closed by turning the lever. The lever may be turned within a lever slot in order to open or close the valve. A protective cap is removably engaged to a neck that is connected to the valve housing. The protective cap locks the lever in place within a retention nook that traverses into the lever slot in order to prevent accidental turning of the lever and subsequent draining of the engine oil. The protective cap may be partially or fully removed from the neck to free the lever from the retention nook and enable the lever to be turned.

8 Claims, 11 Drawing Sheets

RAPID ENGINE OIL DRAINING VALVE WITH PROTECTIVE COVERING

The current application claims a priority to the U.S. Provisional Patent application Ser. No. 62/169,584 filed on Jun. 2, 2015.

FIELD OF THE INVENTION

The present invention relates generally to a shutoff valve. More specifically, the present invention is a rapid engine oil draining valve with protective covering that is utilized to initiate the flow of engine oil exiting a drain port. The protective covering is utilized for preventing accidental opening of the lever-operated valve and draining of the engine oil. The protective covering additionally prevents dirt, sand, and debris from entering the lever slot.

BACKGROUND OF THE INVENTION

One of the most essential tasks associated with vehicle engine maintenance is periodically replacing the engine oil that serves to lubricate the moving parts of a vehicle's engine in order to reduce wear. Engine oil serves several additional purposes such as preventing corrosion of engine parts and transporting heat away from moving engine parts. When replacing engine oil, the old engine oil is typically removed via a drain port located on the oil pan of the engine underneath the vehicle. The old engine oil is collected in a receptacle and then disposed of or recycled. A plug is commonly utilized to seal the drain port. A common shut-off valve type oil extractor utilizes a ball valve or similar mechanism that is able to enable and disable the flow of engine oil through the extractor. While this is an improvement over simply utilizing a plug to seal the oil pan, a shut-off valve type oil extractor may result in accidental draining of the engine oil as well. A conventional shut-off valve type oil extractor features a lever or similar component that may be actuated in order to enable or disable the flow of the engine oil. This lever may be accidentally actuated for a number of reasons. For example, road debris may come into contact with and actuate the lever while the vehicle is moving. As a result, a means of securing the lever in place is often desirable to prevent accidental draining of the engine oil.

The present invention is a rapid engine oil draining valve that includes a protective covering to prevent accidental draining of engine oil at inopportune times. The present invention may be installed into the drain port of an oil pan and allows for the quick replacement of engine oil. A conventional drain plug requires a tool such as a wrench to remove the plug from an oil pan in order to drain oil and there is generally no way to control the flow of oil once the drain plug is removed. The present invention provides a convenient oil drain with no tools required for use and may be opened or closed at any time in order to control the flow of oil.

DETAIL DESCRIPTIONS OF THE INVENTION

Figure 1:
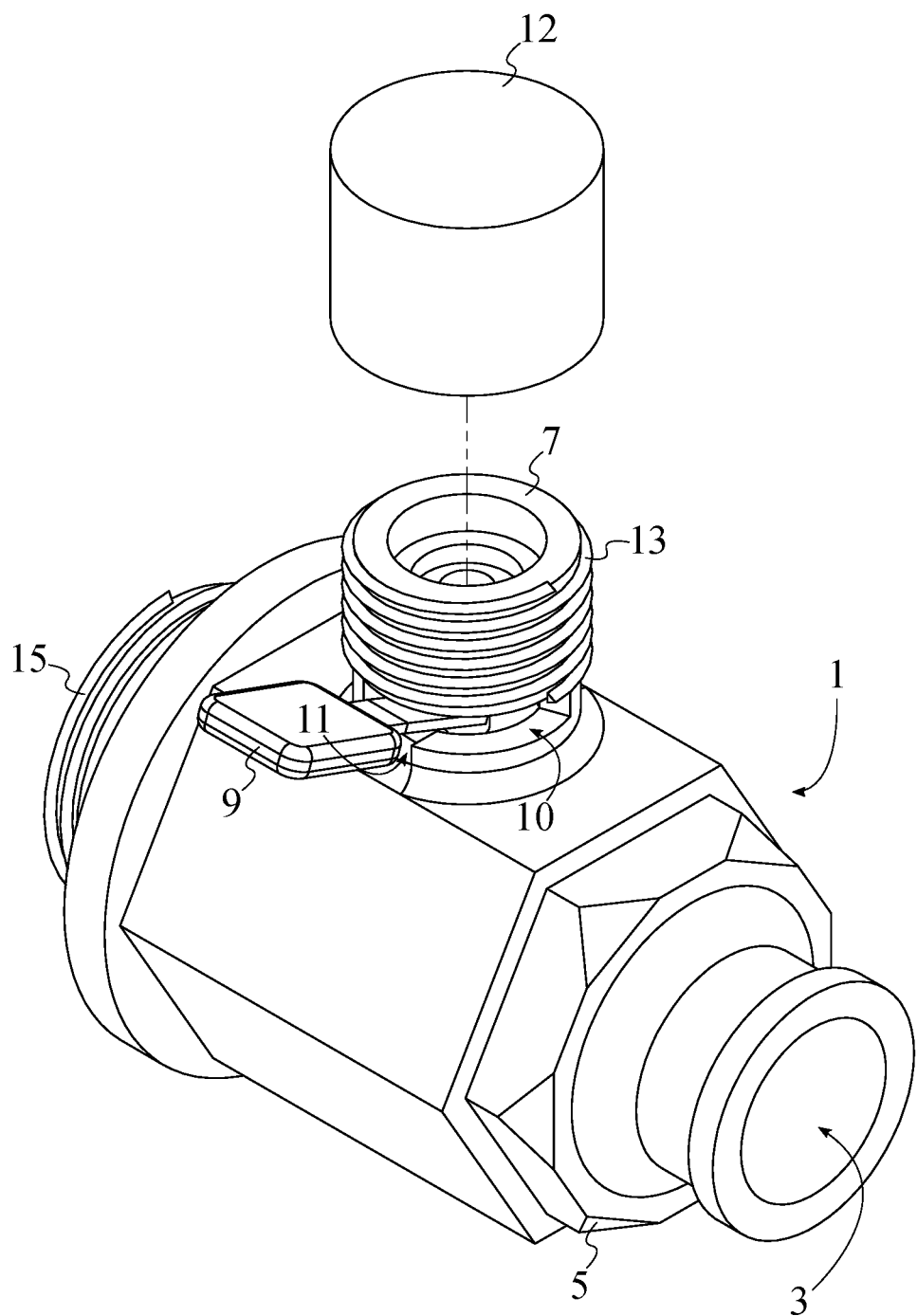
FIG. 1 is a top exploded perspective view of the present invention.
Figure 2:
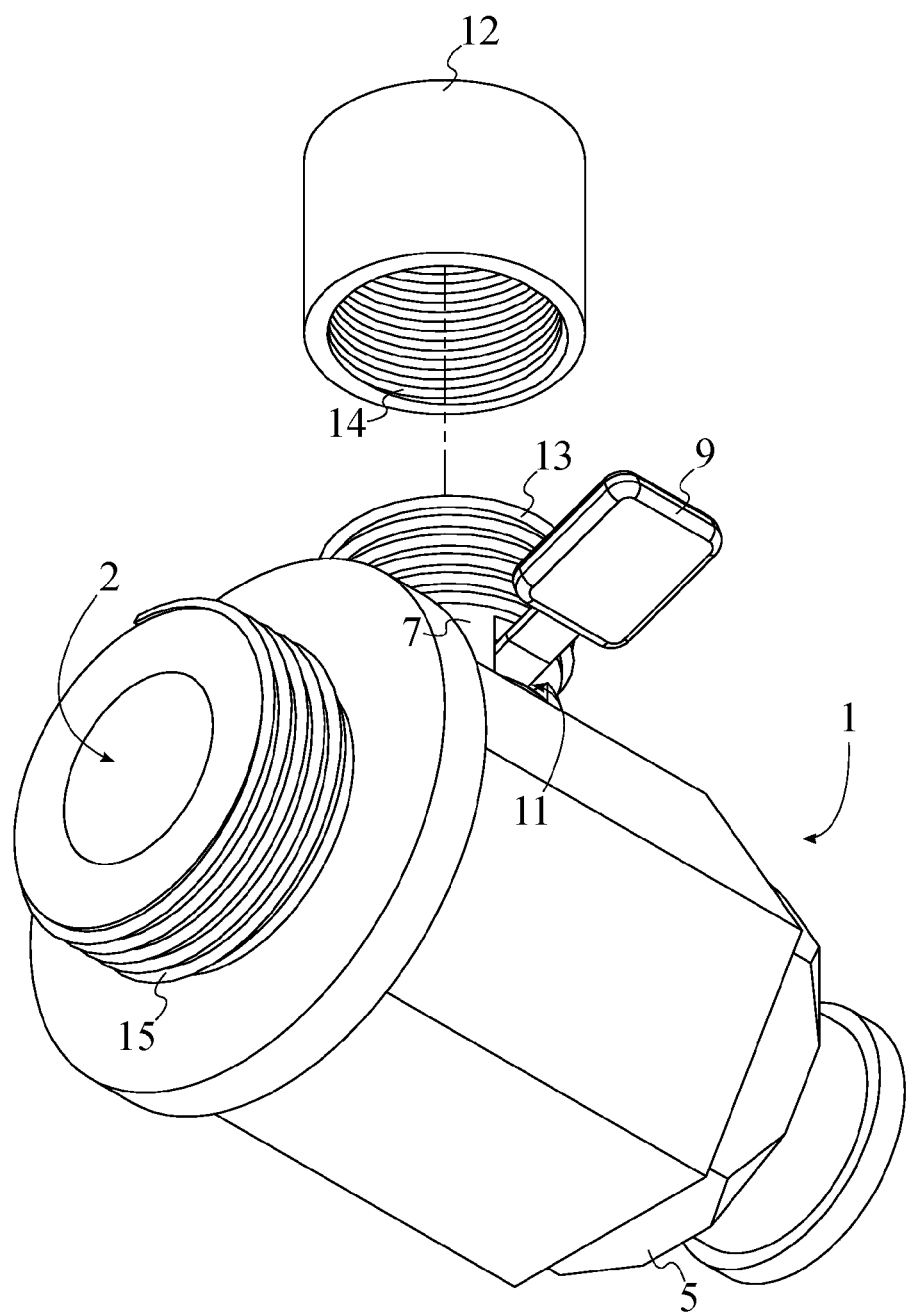
FIG. 2 is a bottom exploded perspective view of the present invention.
Figure 3:
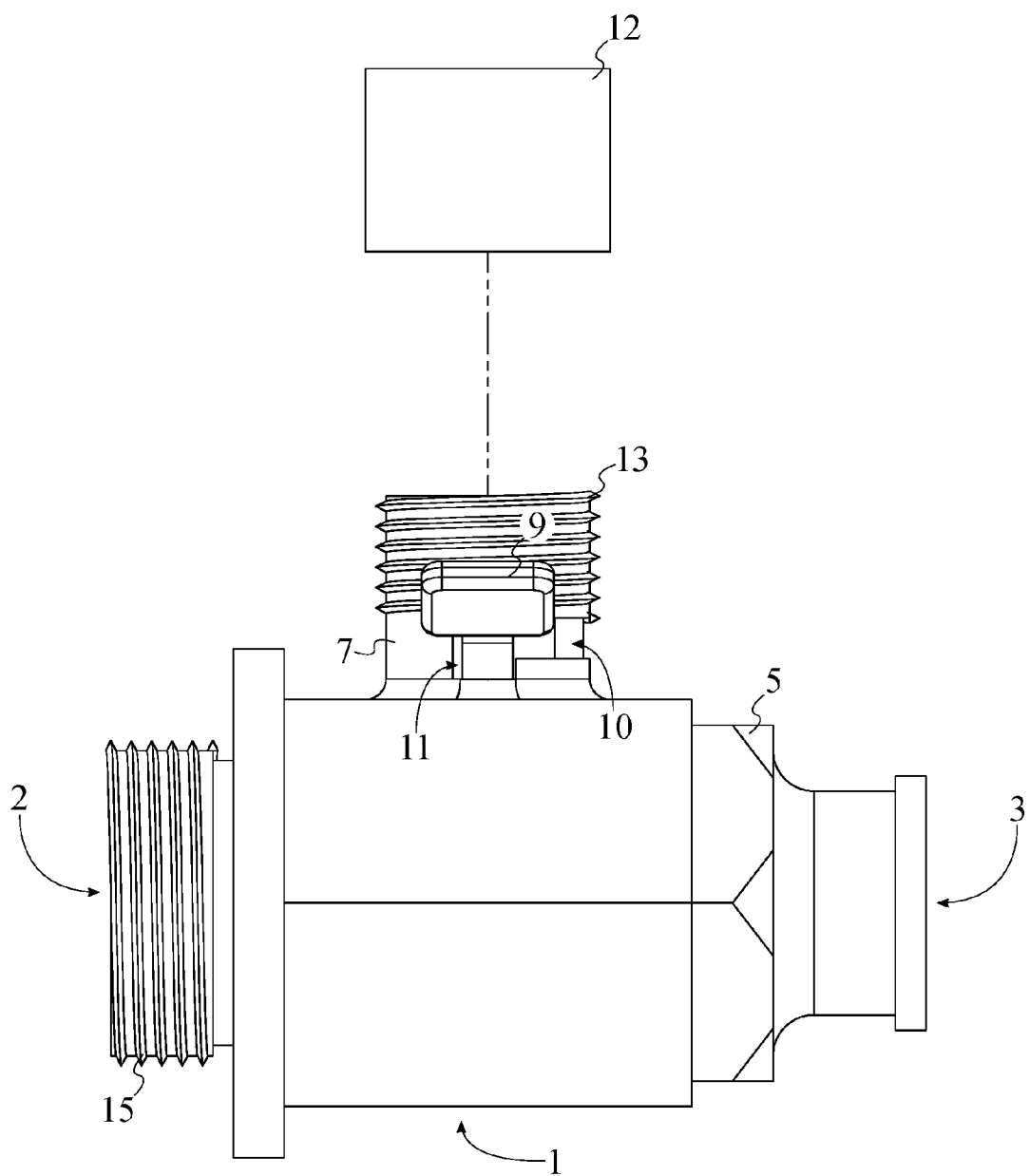
FIG. 3 is a front exploded view of the present invention.
Figure 4:
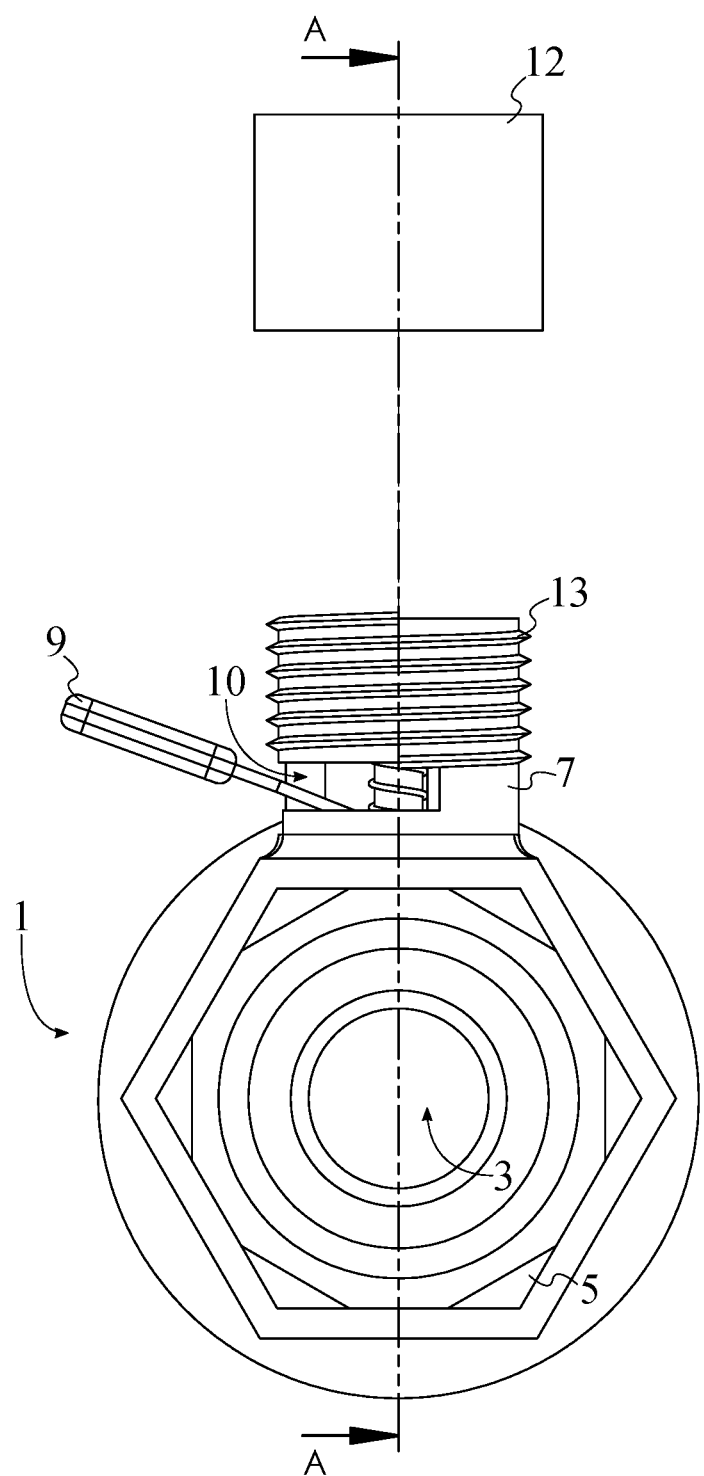
FIG. 4 is a side exploded view of the present invention.

All illustrations of the drawings are for the purpose of describing selected versions of the present invention and are not intended to limit the scope of the present invention.

The present invention is a rapid engine oil draining valve with protective covering that prevents the accidental opening of the valve and subsequent draining of the engine oil. The present invention is shown in FIGS. 1-5 and comprises a valve housing 1, a valve 6, a neck 7, a lever 9, a lever slot 10, a retention nook 11, and a protective cap 12. The valve housing 1 is the main body of the present invention through which engine oil is able to exit from the oil pan of a vehicle. The valve housing 1 is installed into the drain port of the oil pan and is intended to replace a conventional plug that is utilized to seal the drain port. The valve housing 1 comprises an inlet 2, an outlet 3, and a fluid conduit 4. The inlet 2 is an opening through which engine oil is able to enter the valve housing 1 while the outlet 3 is an opening through which the engine oil is able to exit the valve housing 1. The fluid conduit 4 is a channel through which the engine oil is able to travel within the valve housing 1. The inlet 2 is in fluid communication with the outlet 3 through the fluid conduit 4. As such, the engine oil enters the valve housing 1 through the inlet 2, travels through the fluid conduit 4, and exits through the outlet 3 during draining.

Figure 5:
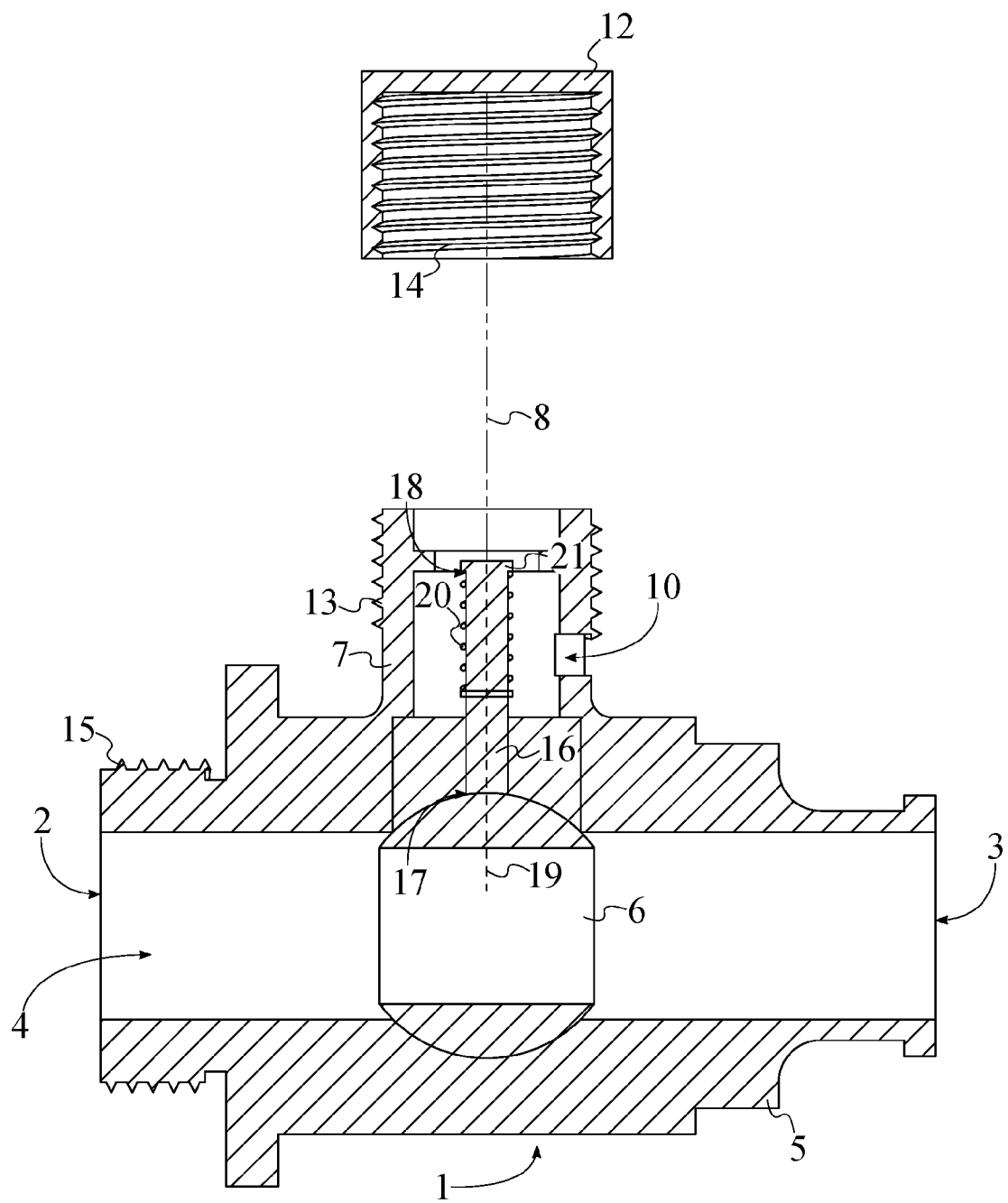
FIG. 5 is a cross-sectional view of the present invention taken along line A-A of FIG. 4.

The valve 6 is utilized to enable and disable the flow of engine oil. The valve 6 is positioned within the fluid conduit 4, in between the inlet 2 and the outlet 3, enabling the valve 6 to stop the flow of the engine oil between the inlet 2 and the outlet 3. In the preferred embodiment of the present invention, the valve 6 is a ball valve as shown in FIG. 5. The valve 6 is rotatably positioned within the valve housing 1. In this case, the valve 6 includes an opening that may be moved into and out of alignment with the fluid conduit 4 in order to respectively enable and disable the flow of the engine oil.

In the preferred embodiment of the present invention, the neck 7 is a tubular extrusion that is positioned on the valve housing 1. The neck 7 is externally connected to the valve housing 1, adjacent to the valve 6. The neck 7 is thus positioned adjacent to the valve 6 and is able to protect the moving mechanical components of the present invention. The lever 9 is utilized to enable and disable the flow of engine oil through the fluid conduit 4. As such, the lever 9 is mechanically coupled to the valve 6, enabling the valve 6 to be opened and closed through the lever 9. The lever slot 10 is an opening within the neck 7 that allows the lever 9 to be turned within the neck 7. The lever slot 10 laterally traverses into the neck 7, providing a channel through which the lever 9 is able to slide. The lever 9 traverses into the neck 7 through the lever slot 10, enabling the lever 9 to be mechanically coupled to the valve 6. The lever 9 is slidably engaged into the lever slot 10, allowing the lever 9 to be turned within the lever slot 10 to open and close the valve 6 as needed.

The retention nook 11 is a recessed alcove that holds the lever 9 in place and prevents the lever 9 from moving in order to prevent unintentional opening of the valve 6 and subsequent accidental draining of the engine oil. The retention nook 11 perpendicularly traverses into the lever slot 10, offsetting the retention nook 11 from the lever slot 10 and ensuring that the lever 9 must be moved from the retention nook 11 into the lever slot 10 in order to open the valve 6.

Figure 6:
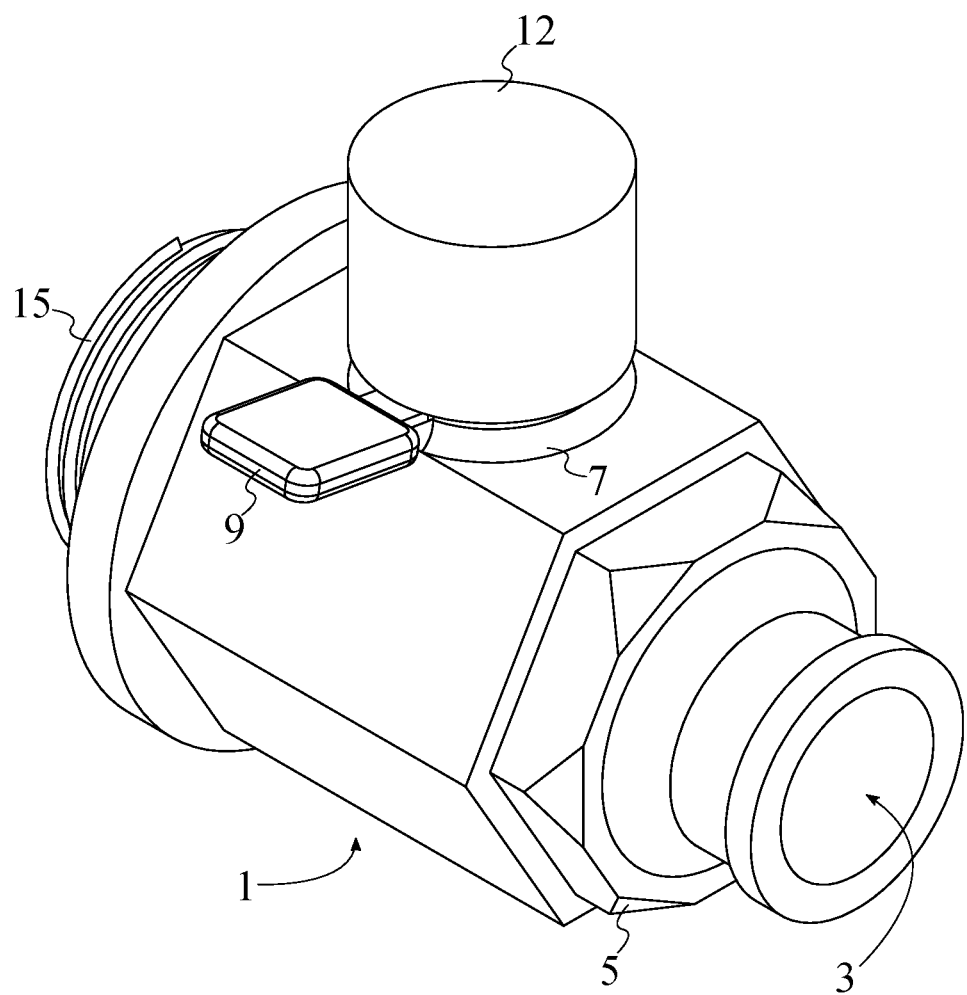
FIG. 6 is a top perspective view of the present invention in a locked configuration.
Figure 7:
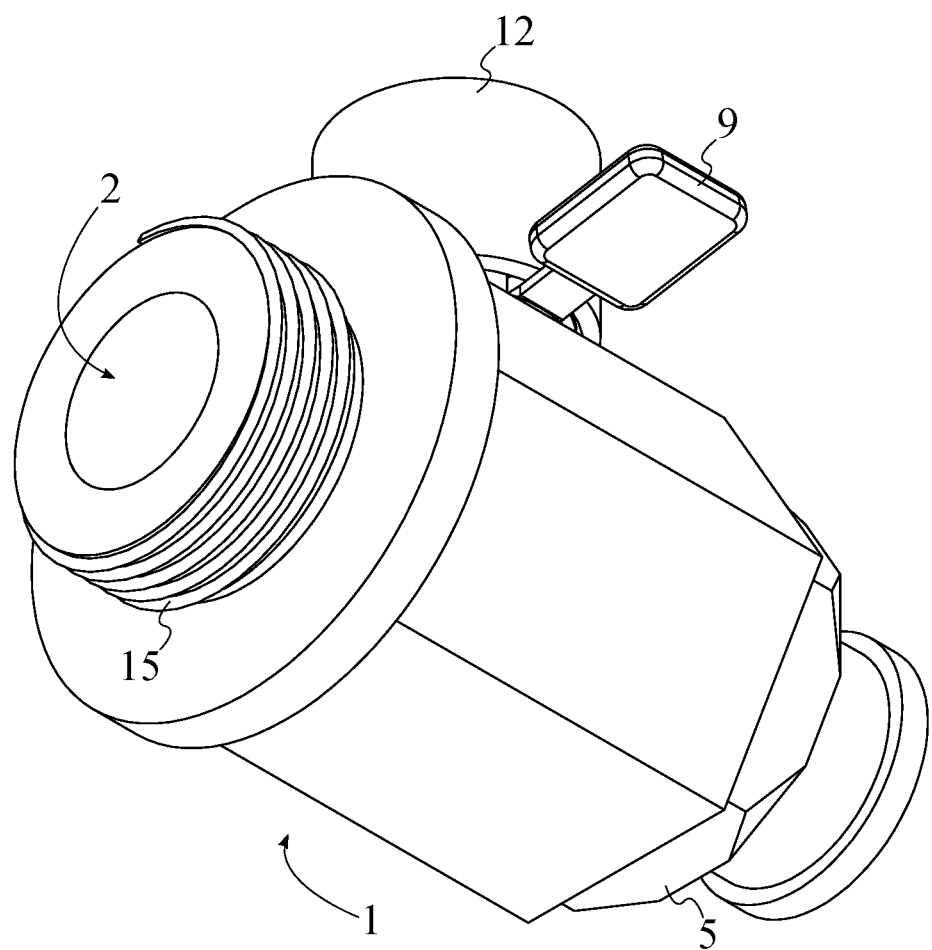
FIG. 7 is a bottom perspective view of the present invention in the locked configuration.
Figure 8:
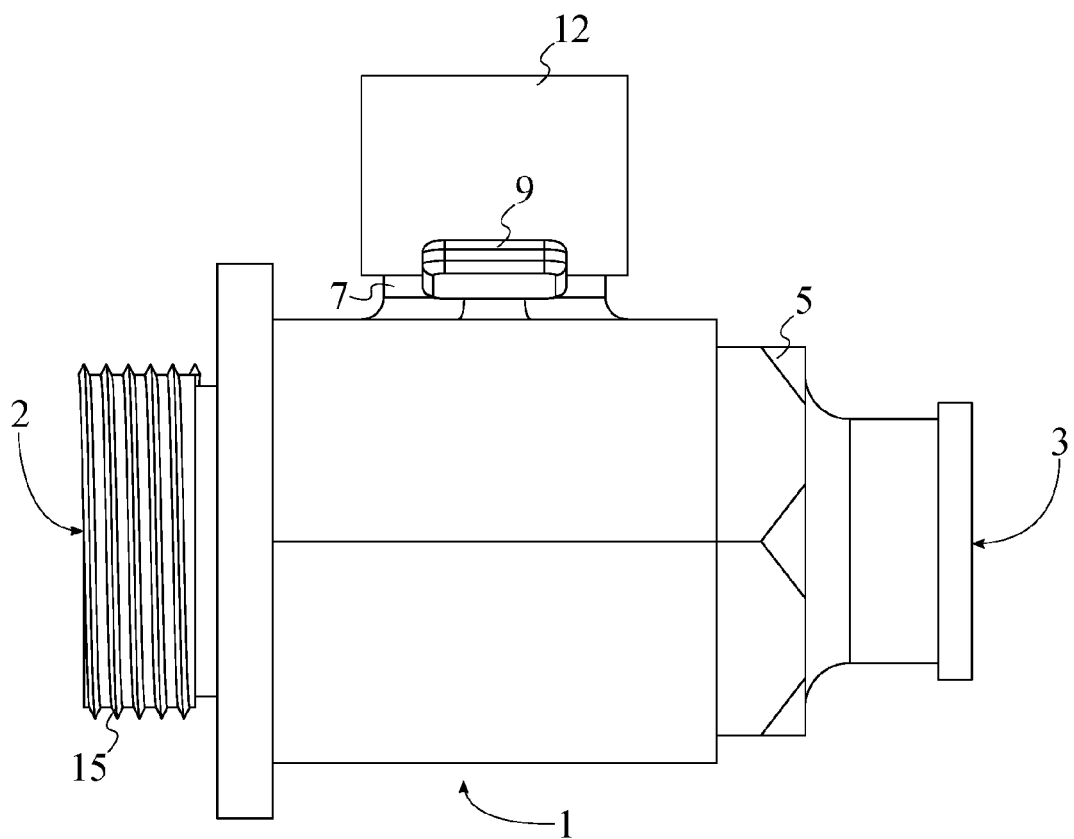
FIG. 8 is a front view of the present invention in the locked configuration.

The protective cap 12 is utilized to ensure that the lever 9 remains in place within the retention nook 11 to prevent accidental draining of the engine oil. The protective cap 12 is removably engaged to the neck 7, allowing the protective cap 12 to be separated from the neck 7 when the user wishes to move the lever 9 from the retention nook 11 into the lever slot 10. The retention nook 11 is positioned in between the valve housing 1 and the lever slot 10, allowing the protective cap 12 to press the lever 9 into the retention nook 11 as shown in FIGS. 6-8.

The present invention further comprises a first male threading 13 and a female threading 14. The first male threading 13 and the female threading 14 are utilized to secure the protective cap 12 to the neck 7. The first male threading 13 is helically connected around the neck 7 while the female threading 14 is helically connected within the protective cap 12. The protective cap 12 may thus be screwed onto or unscrewed from the neck 7 through the first male threading 13 and the female threading 14. The female threading 14 is removably engaged to the first male threading 13, allowing the protective cap 12 to be partially unscrewed or altogether removed from the neck 7.

As previously discussed, the present invention is installed into the drain port of a vehicle engine oil pan. The present invention further comprises a second male threading 15 that is utilized to easily install the present invention into a drain port. The second male threading 15 is helically connected around the inlet 2. This enables the inlet 2 to be screwed into a drain port of a vehicle engine oil pan. The second male threading 15 additionally allows the present invention to easily be removed from the drain port.

The valve housing 1 further comprises a hex head portion 5 that facilitates the installation and removal of the present invention into the drain port of a vehicle engine oil pan. The hex head portion 5 enables the use of a wrench or similar tool in increasing the user's leverage when installing and uninstalling the present invention. The hex head portion 5 is positioned in between the neck 7 and the outlet 3, positioning the hex head portion 5 away from the inlet 2 and allowing the hex head portion 5 to be utilized to increase the user's leverage when installing and uninstalling the present invention.

With reference to FIG. 5, the present invention further comprises a leveraging member 16, a resetting spring 20, and a retention plate 21. The leveraging member 16 is utilized to transfer torque from the lever 9 to the valve 6 when the lever 9 is turned to open and close the valve 6. A first end 17 of the leveraging member 16 is adjacently connected to the valve 6, enabling the valve 6 to rotate along with the leveraging member 16. A rotation axis 19 of the leveraging member 16 is collinear with a central axis 8 of the neck 7. The leveraging member 16 is thus positioned and oriented in a manner such that the rotation of the leveraging member 16 within the neck 7 is able to rotate the valve 6 as well. The lever 9 is mechanically coupled to the valve 6 through the leveraging member 16. This allows the lever 9 to be utilized to turn the valve 6 by applying torque to the leveraging member 16. The resetting spring 20 is utilized to press the lever 9 into the retention nook 11 when the present invention is not in use in order to prevent accidental draining of the engine oil. The retention plate 21 is utilized to hold the resetting spring 20 in place and to prevent the resetting spring 20 from separating from the leveraging member 16. The retention plate 21 is adjacently connected to a second end 18 of the leveraging member 16 and is thus able to prevent the resetting spring 20 from sliding off the second end 18. The resetting spring 20 is helically positioned around the leveraging member 16, in between the retention plate 21 and the lever 9. This enables the lever 9 to compress the resetting spring 20 when transitioning from the retention nook 11 to the lever slot 10. When the lever 9 is positioned within the retention nook 11, the resetting spring 20 is pressed against the lever 9, ensuring that the resetting spring 20 is able to press the lever 9 into the retention nook 11.

As previously discussed, the protective cap 12 is able to ensure that the lever 9 remains within the retention nook 11 when the present invention is not in use. The protective cap 12 serves as an additional safeguard against accidental draining of the engine oil, complementing the resetting spring 20 that presses the lever 9 into the retention nook 11. Because the protective cap 12 is screwed onto the neck 7, it is virtually impossible for the protective cap 12 to become unintentionally separated from the neck 7 when the protective cap 12 is in place. The lever 9 and the protective cap 12 are shown in a locked configuration in FIGS. 6-8. In the locked configuration, the lever 9 is pressed against the retention nook 11 by the protective cap 12. The lever 9 is thus unable to exit the retention nook 11 until the protective cap 12 is slightly unscrewed or altogether removed from the neck 7. The protective cap 12 additionally prevents dust, dirt, and other debris from entering and accumulating within the neck 7.

Figure 9:
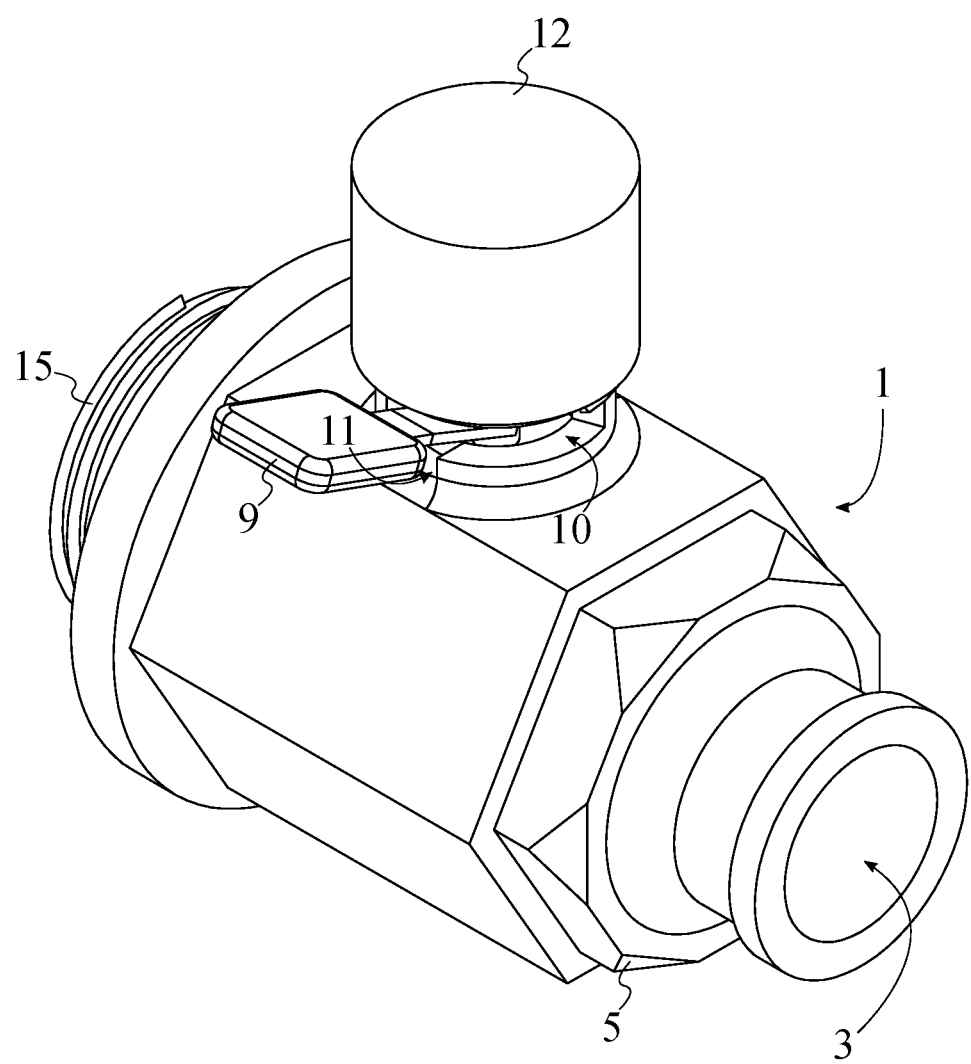
FIG. 9 is a top perspective view of the present invention in an unlocked configuration.
Figure 10:
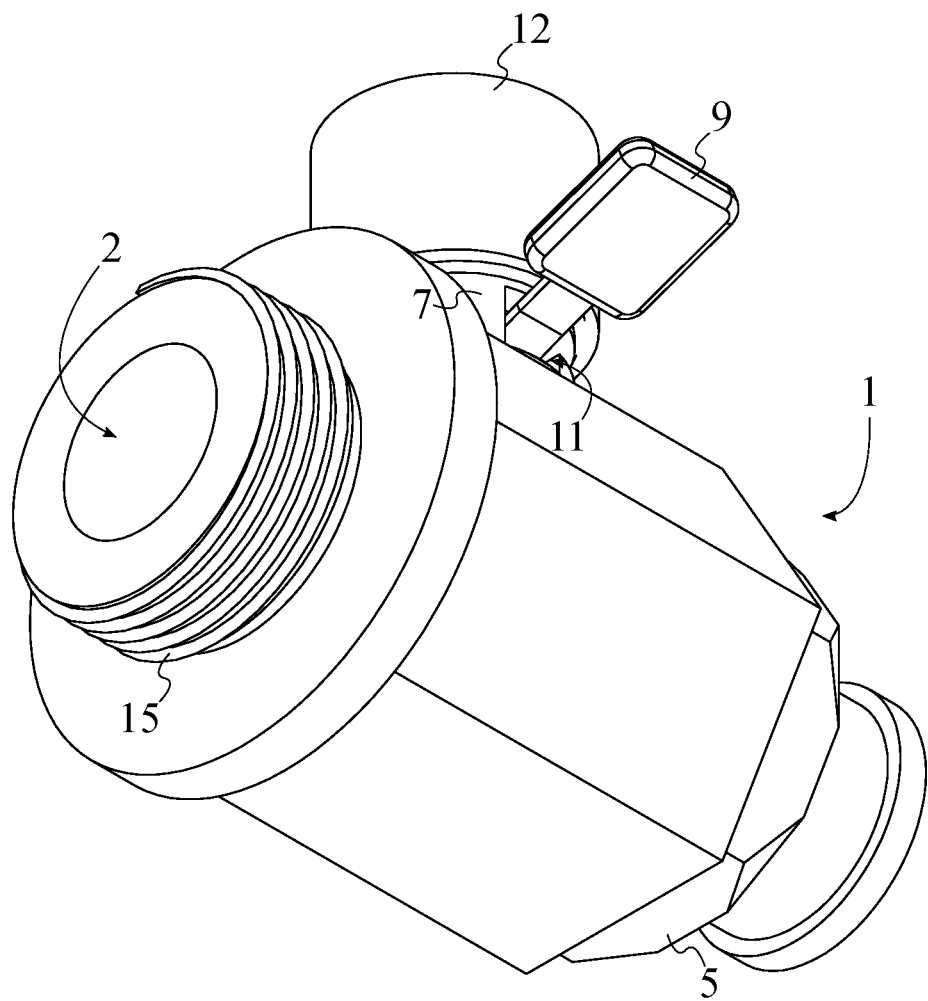
FIG. 10 is a bottom perspective view of the present invention in the unlocked configuration.
Figure 11:
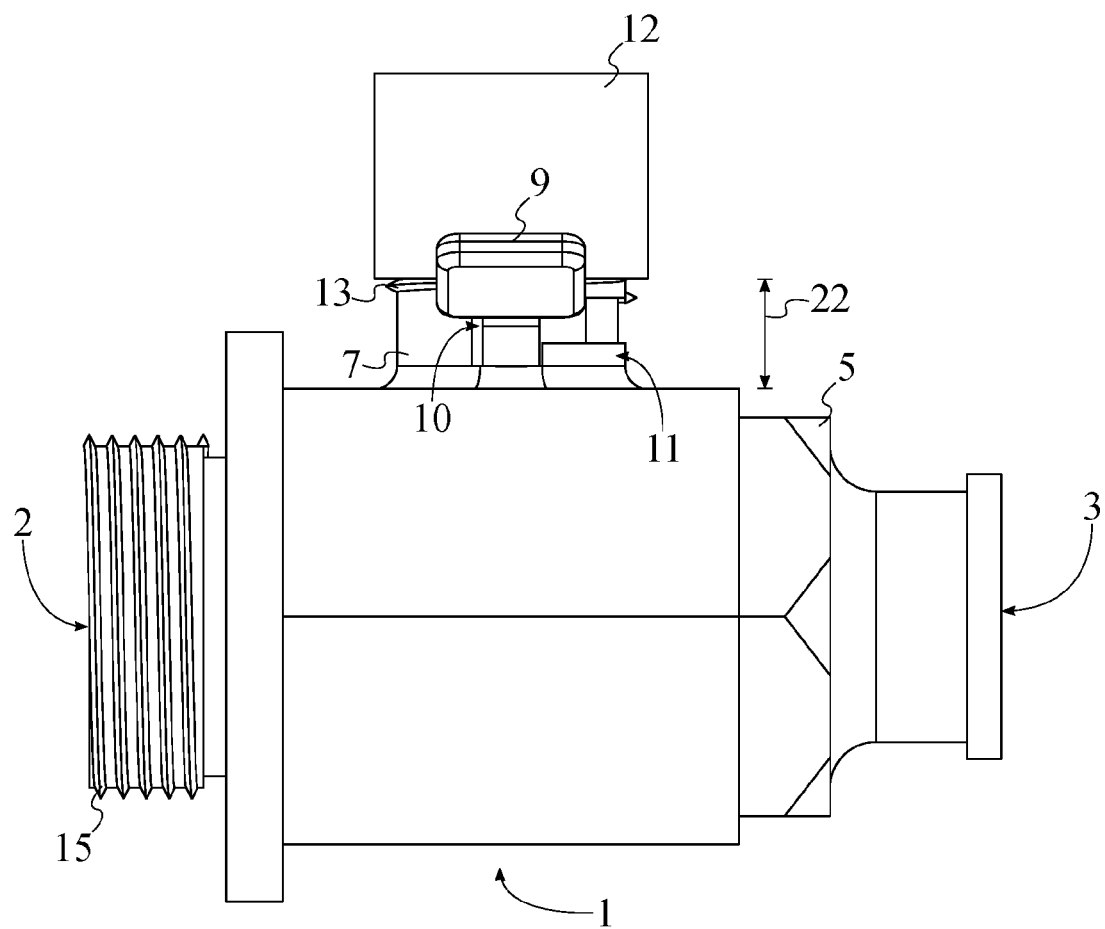
FIG. 11 is a front view of the present invention in the unlocked configuration.

The lever 9 and the protective cap 12 are shown in an unlocked configuration in FIG. 9-11. In the unlocked configuration, the lever 9 is slidably engaged into the lever slot 10, allowing the lever 9 to be turned in order to open or close the valve 6. The protective cap 12 is offset from the valve housing 1 by a release distance 22. It is not required to completely remove the protective cap 12 from the neck 7 in order to free the lever 9 from the retention nook 11. The protective cap 12 may thus be partially unscrewed from the neck 7 until the lever 9 is able to be removed from the retention nook 11.

Although the present invention has been explained in relation to its preferred embodiment, it is understood that many other possible modifications and variations can be made without departing from the spirit and scope of the present invention as hereinafter claimed.

What is claimed is:

1. A rapid engine oil draining valve with protective covering comprising:
   a valve housing;
   a valve;
   a neck;
   a lever;
   a lever slot;
   a retention nook;
   a protective cap;
   a leveraging member;
   a resetting spring;
   a retention plate;
   the valve housing comprising an inlet, an outlet and a fluid conduit;

the inlet being in fluid communication with the outlet through the fluid conduit;
the valve being accommodated within the fluid conduit;
the valve being located in between the inlet and the outlet;
the neck perpendicularly extending from the valve housing;
the neck being integrally connected to the valve housing;
the neck being located adjacent to the valve;
the lever slot laterally traversing into the neck;
the lever traversing into the neck through the lever slot;
the retention nook perpendicularly traversing into the lever slot;
the retention nook being located in between the valve housing and the lever slot;
the protective cap being removably engaged to the neck;
the leveraging member comprising a first end and a second end;
the first end and the second end being located opposite to each other;
the first end being connected to the valve;
the second end being connected to the retention plate;
the lever being mechanically coupled to the leveraging member;
the resetting spring being helically positioned around the leveraging member;
the resetting spring being located in between the retention plate and the lever;
the resetting spring being pressed against the retention plate and the lever;
in response to the lever being remained within the retention nook by the resetting spring being pressed against the lever towards the retention nook and the protective cap abutting against the lever, the lever being in a locked configuration;
in response to the protective cap being moved along the neck offset from the valve housing with a release distance, the lever being allowed to be moved into the lever slot from the retention nook; and
in response to the lever being remained within the lever slot, the lever being in an unlocked configuration.

2. The rapid engine oil draining valve with protective covering as claimed in claim 1 comprising:
a first male threading;
a female threading;
the first male threading being helically connected around the neck;
the female threading being helically connected within the protective cap; and
the female threading being removably engaged to the first male threading.

3. The rapid engine oil draining valve with protective covering as claimed in claim 1 comprising:
a second male threading; and
the second male threading being helically connected around the inlet.

4. The rapid engine oil draining valve with protective covering as claimed in claim 1 comprising:
the valve housing comprising a hex head portion; and
the hex head portion being positioned in between the neck and the outlet.

5. The rapid engine oil draining valve with protective covering as claimed in claim 1 comprising:
the valve being a ball valve; and
the valve being rotatably accommodated within the valve housing.

6. The rapid engine oil draining valve with protective covering as claimed in claim 1 comprising:
a rotation axis of the leveraging member being collinear with a central axis of the neck.

7. The rapid engine oil draining valve with protective covering as claimed in claim 1 comprising:
in response to the lever being in the locked configuration, the valve being prevented from being open.

8. The rapid engine oil draining valve with protective covering as claimed in claim 1 comprising:
in response to the lever being in the unlocked configuration, the valve being allowed to be open by the lever being slided within the lever slot.

* * * * *